(12) United States Patent
Collette (10) Patent No.: US 8,123,460 B2
(45) Date of Patent: Feb. 28, 2012

(54) UAV POD COOLING USING INTEGRATED DUCT WALL HEAT TRANSFER

(75) Inventor: Daniel Collette, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 788 days.

(21) Appl. No.: 12/178,242

(22) Filed: Jul. 23, 2008

(65) Prior Publication Data

US 2010/0021288 A1    Jan. 28, 2010

(51) Int. Cl.
*F01D 1/24* (2006.01)
*F01D 13/00* (2006.01)
*F03D 3/02* (2006.01)
*F04D 13/04* (2006.01)
*F04D 25/16* (2006.01)

(52) U.S. Cl. .............. 415/68; 415/79; 415/86; 361/687; 361/699

(58) Field of Classification Search .................... 415/66, 415/67, 68, 69, 77, 79, 86, 87; 361/687, 361/699
See application file for complete search history.

(56) References Cited

U.S. PATENT DOCUMENTS 5,065,282 A    11/1991    Polonio
(Continued)

FOREIGN PATENT DOCUMENTS

EP    1767453    6/2008
(Continued)

*Primary Examiner* — David Nhu
(74) *Attorney, Agent, or Firm* — Shumaker & Sieffert, P.A.

(57) ABSTRACT

Electronic equipment frequently requires cooling to maintain the integrity and reliability of the equipment, and to elongate the life expectancy of the equipment. When in operation, the fan of a UAV creates airflow comprising outside air directed across the duct of the UAV. Utilizing this airflow generated by the fan of a UAV to provide heat transfer from a equipment enclosure accomplishes efficient heat transfer. The methods described herein for transferring heat from an equipment enclosure using an airflow generated by a fan of a UAV may be employed for UAVs having a variety of duct shapes, and having equipment enclosures inside the duct or in detachable equipment enclosures located on the duct of the UAV.

20 Claims, 7 Drawing Sheets

U.S. PATENT DOCUMENTS

| | | | |
|---|---|---|---|
| 5,150,857 A | 9/1992 | Moffitt et al. | |
| 5,152,478 A | 10/1992 | Cycon et al. | |
| 5,295,643 A | 3/1994 | Ebbert et al. | |
| 5,575,438 A | 11/1996 | McGonigle et al. | |
| 5,695,153 A | 12/1997 | Britton et al. | |
| 5,966,286 A * | 10/1999 | O'Connor et al. | 361/699 |
| 6,067,229 A | 5/2000 | Johnson | |
| 6,355,362 B1 | 3/2002 | Jones | |
| 6,450,445 B1 | 9/2002 | Moller | |
| 6,604,706 B1 | 8/2003 | Bostan | |
| 6,647,707 B2 * | 11/2003 | Dev | 60/39.43 |
| 6,691,949 B2 | 2/2004 | Plump et al. | |
| 6,721,646 B2 | 4/2004 | Carroll | |
| 7,032,861 B2 | 4/2006 | Sanders, Jr. et al. | |
| 7,044,422 B2 | 5/2006 | Bostan | |
| 7,249,732 B2 | 7/2007 | Sanders, Jr. et al. | |
| 7,325,772 B1 | 2/2008 | Hanewinkel, III | |
| 2004/0094662 A1 | 5/2004 | Sanders, Jr. et al. | |
| 2004/0129828 A1 | 7/2004 | Bostan | |
| 2005/0082421 A1 | 4/2005 | Perlo et al. | |
| 2006/0049304 A1 | 3/2006 | Sanders, Jr. et al. | |
| 2006/0173242 A1 | 8/2006 | Navok | |
| 2006/0192047 A1 | 8/2006 | Goossen | |
| 2006/0231675 A1 | 10/2006 | Bostan | |
| 2007/0034738 A1 | 2/2007 | Sanders, Jr. et al. | |
| 2007/0051848 A1 | 3/2007 | Mantych et al. | |
| 2007/0193650 A1 | 8/2007 | Eannati | |
| 2007/0221790 A1 | 9/2007 | Goossen | |
| 2007/0228214 A1 | 10/2007 | Horak | |
| 2007/0244608 A1 | 10/2007 | Rath et al. | |
| 2007/0262195 A1 | 11/2007 | Bulaga et al. | |
| 2007/0295298 A1 | 12/2007 | Mark | |
| 2008/0036075 A1 | 2/2008 | Taylor | |

FOREIGN PATENT DOCUMENTS

| | | |
|---|---|---|
| WO | 0015497 | 3/2000 |
| WO | 2004002821 | 1/2004 |

* cited by examiner

UAV POD COOLING USING INTEGRATED DUCT WALL HEAT TRANSFER

GOVERNMENT RIGHTS

The United States Government may have acquired certain rights in this invention pursuant to Contract No. W56HZV-05-C-0724 awarded by the U.S. Army (TACOM).

FIELD

The present invention relates generally to a system and method for cooling equipment located on a ducted-fan unmanned aerial vehicle (UAV). More specifically, the invention relates to a system and method for cooling electronic equipment located on the UAV by directly or indirectly using airflow generated by the fan of the UAV.

BACKGROUND

UAVs may carry onboard electronic equipment such as communication equipment, flight controls, cameras, sensors, and computing equipment. This equipment may generate a large amount of heat when in operation. Because it is desirable to maintain electronic equipment within a specified temperature range to optimize the performance and operational life of the equipment, it may be necessary to provide cooling for the equipment.

The equipment may be contained in a sealed enclosure to protect the equipment from hazards in the environment of the enclosure. Containing the equipment in such an enclosure may prevent outside air from entering into the equipment enclosure. If the equipment is contained in a protected environment, such as an enclosure having an airtight seal, it may be desirable to provide an alternative method of cooling for the equipment that does not require outside air to be passed over the equipment. Therefore, alternative methods for cooling equipment located on a ducted-fan UAV are needed.

Many existing methods of cooling equipment enclosures require a large amount of energy to cool the equipment, and it may be undesirable or impractical to a UAV to provide large amount of energy. Thus, an energy-efficient method of cooling equipment located on an UAV is needed.

SUMMARY

The present invention utilizes the airflow generated by the fan of a UAV to provide heat transfer from an equipment enclosure. Frequently, electronic equipment and other equipment may require cooling. Excessive heat may damage electronics, may decalibrate sensing equipment, and may cause damage to the electronic equipment or other cargo located in the high-temperature enclosure. Also, because electronic equipment may produce a large amount of heat when in operation, temperatures inside an equipment enclosure may quickly elevate beyond the desired temperature.

Using an airflow generated by the fan of the UAV utilizes an existing source of cooling to provide heat transfer from the equipment enclosure, and, thus, provides energy-efficient cooling for the equipment inside the equipment enclosure. Providing heat transfer from the equipment enclosure of a UAV using the airflow generated by the fan of the UAV may be implemented in a variety of ways, providing flexibility in designing a heat transfer mechanism.

Further, transferring heat from the equipment enclosure using the airflow generated by the fan of the UAV may be accomplished for equipment enclosures located inside the duct of the UAV, or, alternatively, may be accomplished for detachable or interchangeable equipment enclosures located on the UAV.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Utilizing the airflow generated by the fan of a UAV to provide heat transfer from an equipment enclosure accomplishes efficient heat transfer by using an existing cooling airflow already in the vicinity of the equipment enclosures. Because electronic equipment may require cooling to maintain the integrity and reliability of the equipment, and to elongate the life expectancy of the equipment, it may be desirable to provide energy-efficient methods for cooling the equipment.

The methods described herein for transferring heat from an equipment enclosure using an airflow generated by the fan of a UAV may be employed for UAVs having a variety of duct shapes, and having equipment enclosures inside the duct or in detachable or configurable equipment enclosures located on the duct of the UAV.

Figure 1:
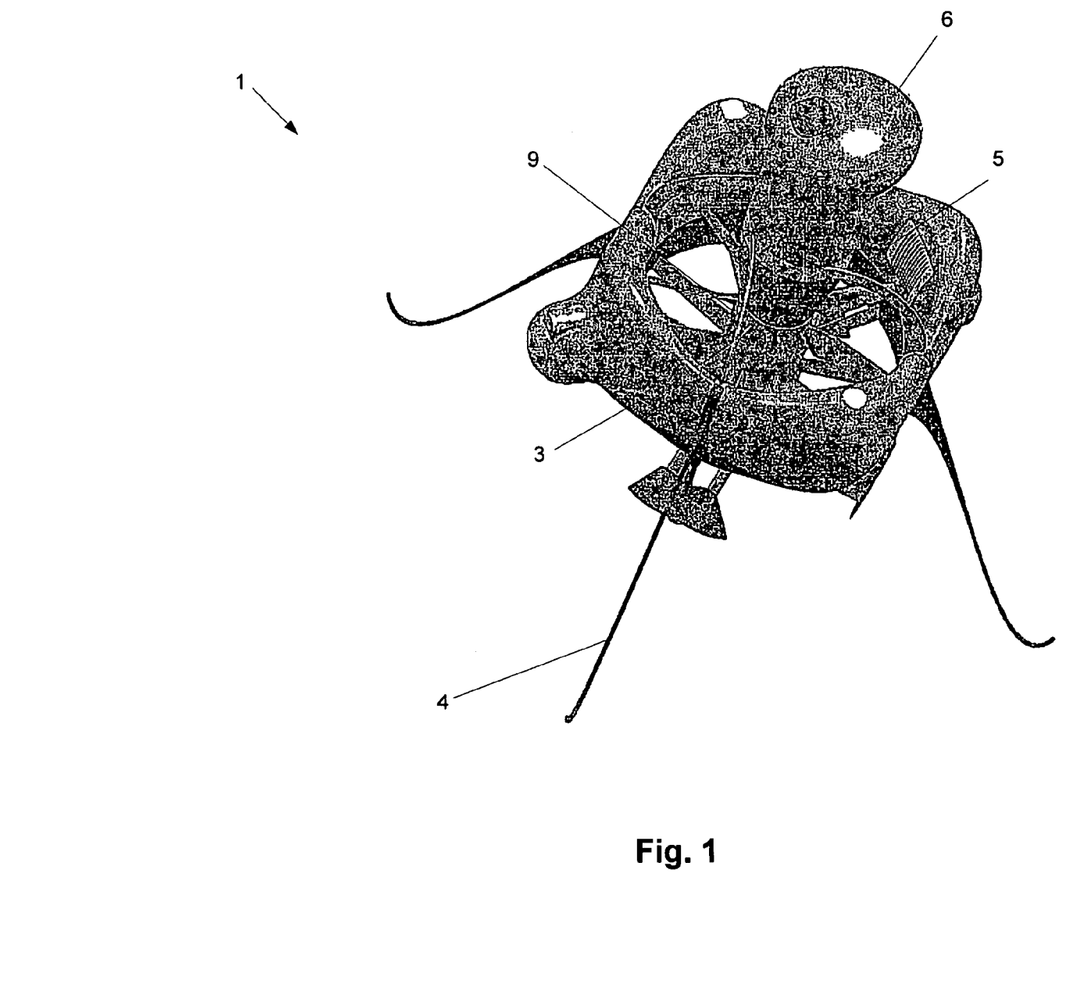
FIG. 1 is a top view of a ducted fan aerial vehicle.

FIG. 1 shows a top view of a ducted van vehicle 1 (UAV). The UAV 1 may have a fan comprising a fan shaft 9 and fan blades 5, a fan motor 6, and landing gear 4.

Figure 2:
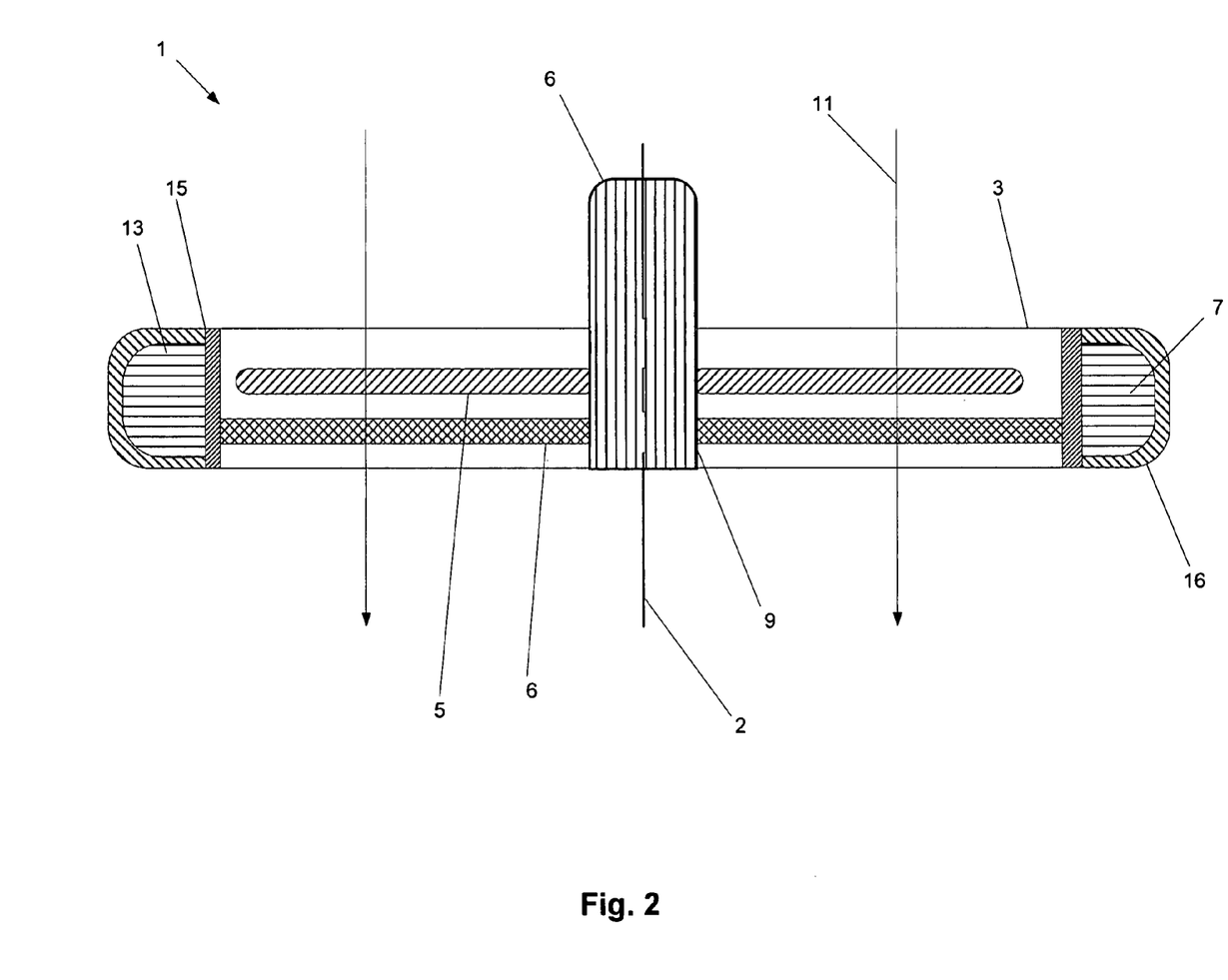
FIG. 2 is a cutaway side view of a ducted fan and electronics.

FIG. 2 shows a cutaway side view of a ducted fan vehicle 1 ("UAV") having a fan shaft 9 and fan blades 5 that rotate around an axis of rotation 2. The fan motor 6 located above the fan shaft 9 rotates the fan blades 5 around the axis of rotation 2, creating airflow 11, discussed further with respect to FIGS. 3a-h. The stators 6 hold duct 3 fixed in relation to the fan shaft 9. The duct 3 may have an inside duct wall 15 and an outside duct wall 16. The thickness of the duct walls 15, 16 may vary and may be larger or smaller than those shown in FIG. 2. The area formed between the duct inside wall 15 and the duct outside wall 16 may form an equipment enclosure 13. Inside the equipment enclosure 13 may be stored equipment 7, such as flight controls, communications equipment, sensors, cameras, information processing equipment, and payload.

The equipment 7 may produce a large amount of heat when in operation, and it may be necessary to provide cooling for the equipment 7. Excessively high temperatures around the equipment 7 may cause failure of processing equipment, decalibration of sensors, and degradation of the quality of information sensed by sensors and cameras.

The equipment 7 may be sealed in order to prevent internal air (i.e., air internal to the equipment enclosure 13) from mixing with outside air (i.e., air external to the equipment enclosure 13). Sealing the equipment 7 may protect the equipment 7 from environmental conditions that may be harmful to the equipment 7, such as moisture, corrosive chemicals in the atmosphere, particles such as plant matter, debris, and pollutants, as well as nuclear, biological or chemical contaminants. The equipment 7 may be enclosed in a hermetically sealed enclosure to prevent these harmful conditions from affecting the performance of the equipment 7.

When the UAV 1 is in flight, the fan blades 5 may create airflow 11. The direction of the airflow 11 may be in the direction shown in FIG. 2, toward the base of the UAV 1. However, the UAV 1 may have a fan capable of reversing direction and may be capable of directing airflow 11 in several directions.

Because outside air may have a lower temperature than the temperature inside the equipment enclosure 13, the airflow 11 may be used to cool the equipment 7.

FIGS. 3a-3h illustrate several ways in which the airflow 11 generated by the UAV 1 in operation may be used to cool the equipment 7.

Figure 3A:
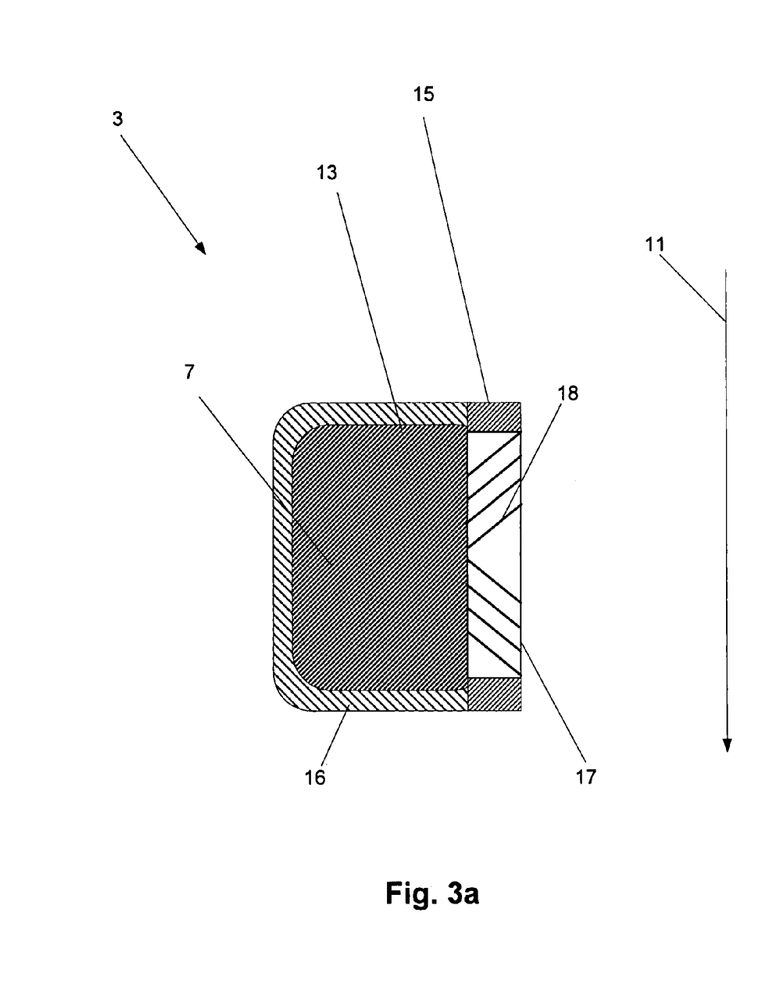
FIG. 3a is a cutaway side view of the ducted fan having a cooling system comprising a venting apparatus.

FIG. 3a shows a cutaway view of the duct 3, wherein the duct inside wall 15 has an opening 17 in which vanes 18 are positioned to allow air to enter and exit the equipment enclosure 13. The vanes 15 may allow outside air to enter the equipment enclosure 13 while preventing large objects from entering the equipment enclosure 13. The airflow 11 caused by the fan of UAV 1 during operation pushes outside air into the equipment enclosure 13 through opening 17 over vanes 18. The outside air may have a lower temperature than the temperature inside the equipment enclosure 13, and, thus, the outside air may carry heat away from the equipment enclosure 13 and may transport the heat out of the equipment enclosure 13 through vanes 18.

Figure 3B:
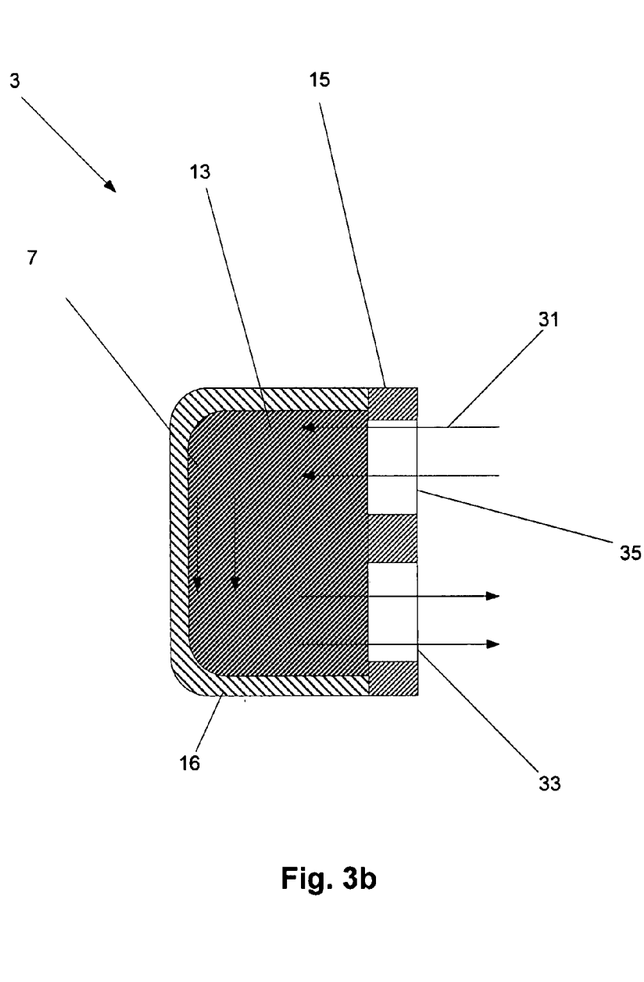
FIG. 3b is a cutaway side view of the ducted fan having a cooling system comprising fans.

FIG. 3b shows a cutaway view of the duct 3 having a first fan 35 and a second fan 33 located in openings in the duct inside wall 15. The first fan 35 creates airflow 31 into the equipment enclosure 13 along the top wall 28 of the equipment enclosure 13. The airflow 31 changes direction when it contacts the rear wall 26 of the equipment enclosure 13 and travels downward to the bottom wall 30 of the equipment enclosure 13, and changes direction again when it contacts the bottom wall 30 of the equipment enclosure 13. The second fan 33 pulls the airflow 31 out of the equipment enclosure 13. The system of FIG. 3b may provide improved heat transfer over the system of FIG. 3a, as the airflow 31 may have a longer path through the equipment 7 located in the equipment enclosure, and may carry away more heat from the equipment 7.

Alternatively, a single fan may be used in the location of the second fan 33 or the first fan 35.

If the single fan is in the location of the second fan 33, the pressure of the airflow 11 may cause outside air to enter the equipment enclosure 13 through opening 31, and the second fan 33 may exhaust the outside air from the equipment enclosure 13. If the single fan is in the location of the first fan 35, the first fan 35 may pull air from the airflow 11 into the equipment enclosure 13, and the pressure of the air in the equipment enclosure 13 may cause the air to be exhausted through the opening 33.

FIGS. 3a and 3b describe methods of removing heat from equipment 7 located onboard a UAV in which outside air enters the equipment enclosure 13 and removes heat from the equipment 7. However, in some cases it may be desirable to prevent outside air from entering the equipment enclosure 13, in order to protect the equipment 7 from unwanted particulate matter that may be present in outside air. The equipment 7 may be located in a hermetically sealed equipment enclosure 13. FIGS. 3c-3h describe systems in which outside air does not enter the equipment enclosure 13, but is used to cool the equipment 7.

Figure 3C:
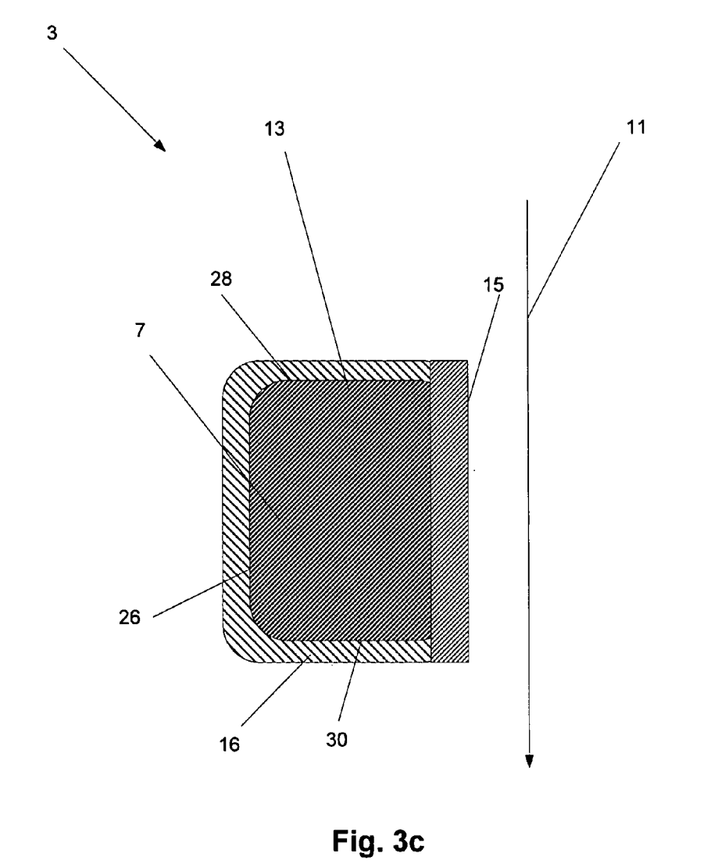
FIG. 3c is a cutaway side view of the ducted fan having a cooling system comprising a conductive duct wall.

FIG. 3c shows a duct 3 having a duct inside wall 15 composed of a highly thermally conductive material. Many different materials may be used, for example, silver, copper, or aluminum. Preferably, the duct 3 may be composed of a material having a thermal conductivity of at least 30 W/m*K. The heat generated by the equipment 7 may be transferred to the thermally conductive duct inside wall 15. The airflow 11 generated by the UAV 1 may pass over the outside surface of the duct inside wall 15 and remove heat from the duct inside wall 15. Thus, heat may be removed from the equipment enclosure 13 without outside air entering the equipment enclosure 13.

Figure 3D:
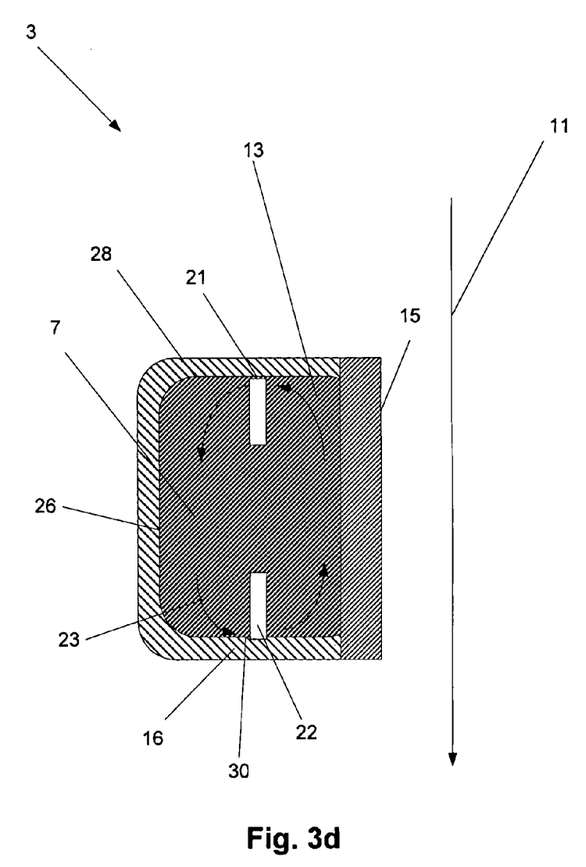
FIG. 3d is a cutaway side view of the ducted fan having a cooling system comprising internal fans.

FIG. 3d shows a duct 3 having a duct inside wall 15 composed of a highly thermally conductive material, as described with respect to FIG. 2c. The system of FIG. 3d also has a first internal fan 21 and a second internal fan 22. The first and second internal fans 21, 22 circulate internal air within the equipment enclosure 13. The first internal fan 21 may push the internal air horizontally along the top wall 28 of the equipment enclosure 13. The airflow 23 may change to a downward direction when it contacts the duct inside wall 15 and travel along the duct inside wall 15, and may again change direction as it contacts the bottom wall 30 of the equipment enclosure 13. The second internal fan 22 may push the airflow 23 along the bottom wall 30 of the equipment enclosure 13, which again changes direction upwardly as it contacts the rear wall 26 of the equipment enclosure 13. The airflow 23 may be cooled by the duct inside wall 15, and may carry away heat from the equipment 7 as it travels along the walls 26, 28, 30 of the equipment enclosure 13. As the internal air travels along the duct inside wall, it may transmit heat to the thermally conductive material of the duct inside wall 15. The duct inside wall may be cooled by the airflow 11 of cooler outside air 11 passing over the duct inside wall 15. Thus, heat is transferred from the equipment enclosure 13 to the outside. Although shown having two fans 21, 22 and a clockwise airflow 23, several fan configurations may be used to direct the airflow 23 in different paths.

Figure 3E:
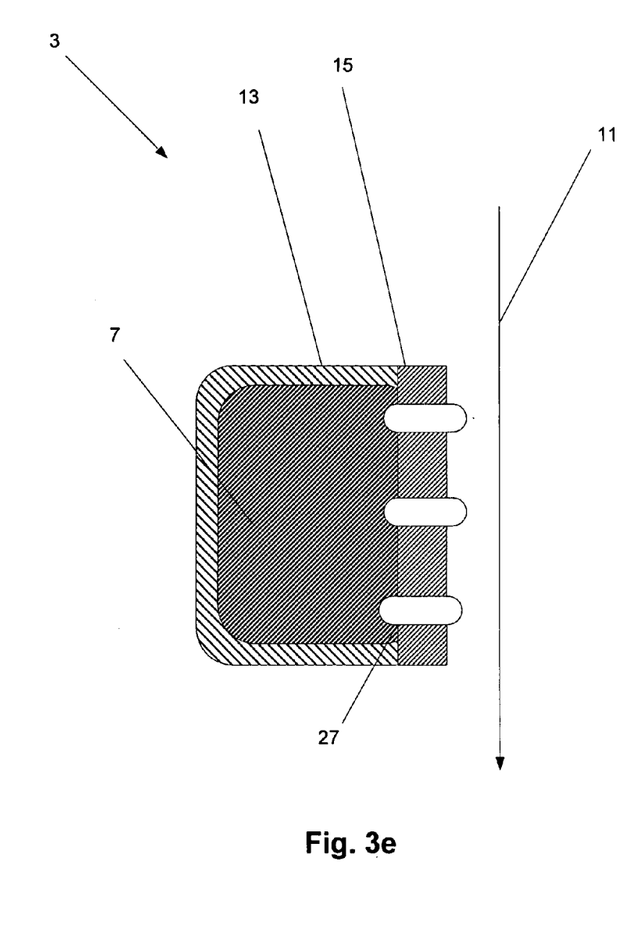
FIG. 3e is a cutaway side view of the ducted fan having a cooling system comprising at least one heat pipe.

FIG. 3e shows a side cutaway view of a duct 3 having heat pipes 27 located between the outside airflow 11 and the equipment enclosure 13. Three heat pipes 27 are shown; however, any number of heat pipes 27 may be employed to transfer heat from the equipment enclosure 13 to the outside. The heat pipes 27 may have one side located in the equipment enclosure 13 to carry away heat from the equipment 7. The opposite end of the heat pipe 27 may be located in an area that is cooled by the outside airflow 11, for instance, outside of the duct inside wall 15, or within the duct inside wall 15 if the duct inside wall 15 is composed of a thermally conductive material.

As the end of the heat pipe 27 in the equipment enclosure 13 carries away heat from the equipment 7, the working fluid in the heat pipe is vaporized and the vapor pressure causes the working fluid to be transported to the opposite end of the heat pipe 27. At the cooler opposite end of the heat pipe 27, the working fluid condenses and is wicked to the end of the heat pipe 27 located in the equipment enclosure 13. This method of heat transfer may provide very efficient heat transfer from the equipment enclosure 13 to the outside. Embodiments of the present invention may utilize various types and constructions of heat pipes, either proprietary or commercially available.

Figure 3F:
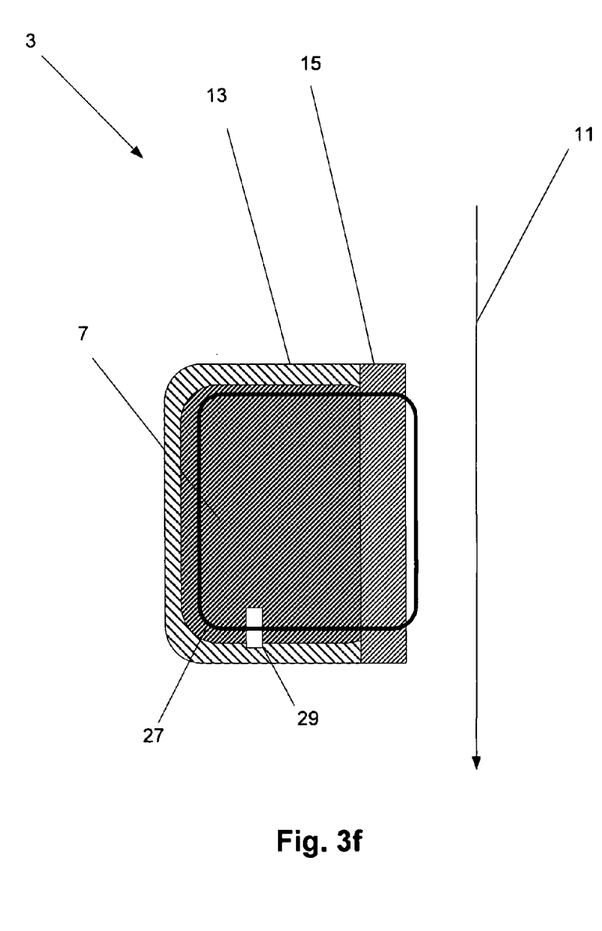
FIG. 3f is a cutaway side view of the ducted fan having a cooling system comprising a heat pump.

FIG. 3f shows a side cutaway view of a duct 3 having a heat pump including a coolant pipe 27 and a pump 29. The coolant pipe 27 may contain a coolant such as water, or another coolant known in the art. The pump 29 pumps the coolant through the equipment enclosure 13, where the coolant carries away heat from the equipment 7, to the duct inside wall 15, where heat is carried away by the outside airflow 11. Although the coolant pipe 27 is shown in FIG. 3f as having a portion located outside the duct inside wall 15, the portion of the coolant pipe 27 located outside the duct inside wall 15 may also be located inside the duct inside wall, or in contact with the duct inside wall 15. The duct inside wall 15 may be cooled by the outside airflow 11, and may thus carry away heat from a coolant pipe 27 located near the duct inside wall 15.

Figure 3G:
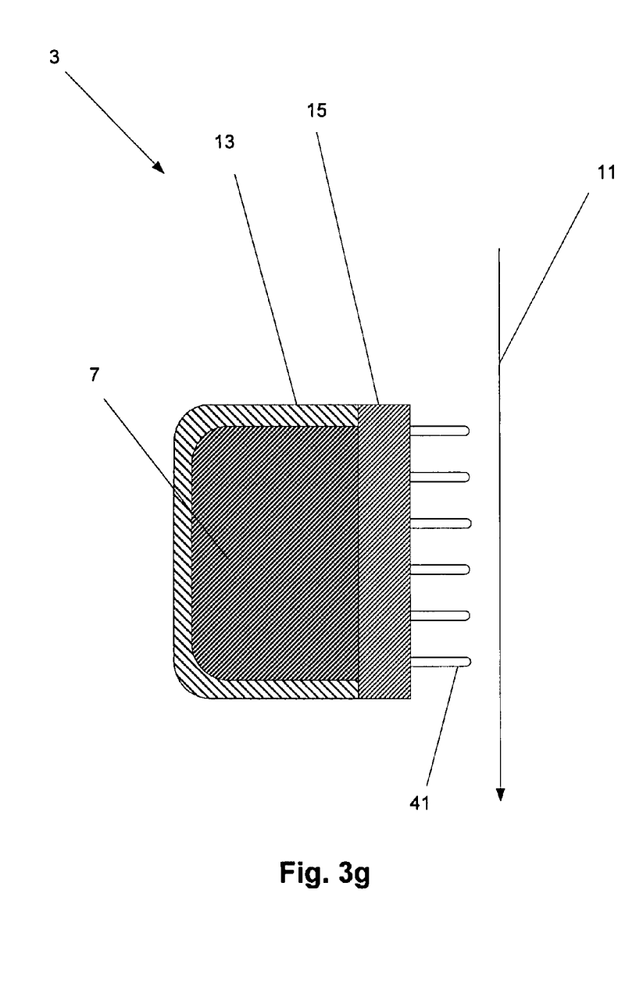
FIG. 3g is a cutaway side view of the ducted fan having a cooling system comprising external fins.

FIG. 3g shows a cutaway side view of a duct 3 having fins 41 located on the duct inside wall 15, and extending generally toward the fan shaft 9. The fins 41 are shown in FIG. 3g in a horizontal orientation, however the fins 41 may also have a vertical orientation (i.e., in the direction of the orientation of the fan shaft 9 in hover mode). Heat may be carried away from the equipment enclosure 13 by the duct inside wall 15. The fins 41 may transmit heat from the duct inside wall 15 to the outside airflow 11. Because the fins 41 provide increased surface area to transmit heat, the fins 41 may provide improved heat transfer over a system in which the outside airflow 11 passes over the duct inside wall 15 without fins 41.

Figure 3H:
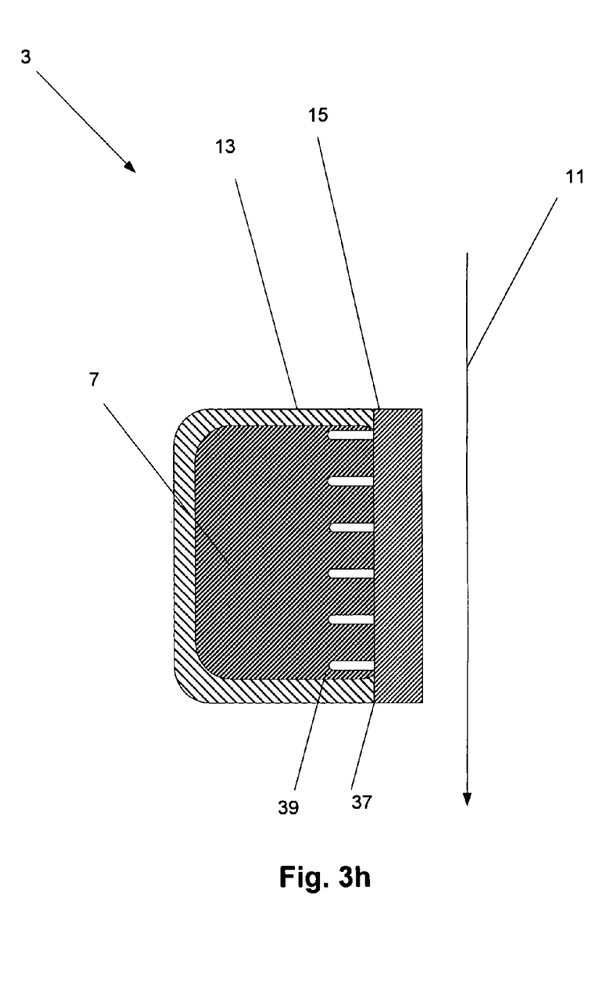
FIG. 3h is a cutaway side view of the ducted fan having a cooling system comprising internal fins.

FIG. 3h shows a cutaway side view of a duct 3 having fins 39 located in the equipment enclosure 13. The fins 39 may provide increased heat transfer from the equipment enclosure 13 to the inside duct wall 15. Outside airflow 11 flows along the duct inside wall 15 and transfers heat from the duct inside wall 15 to the outside airflow 11.

Figure 4:
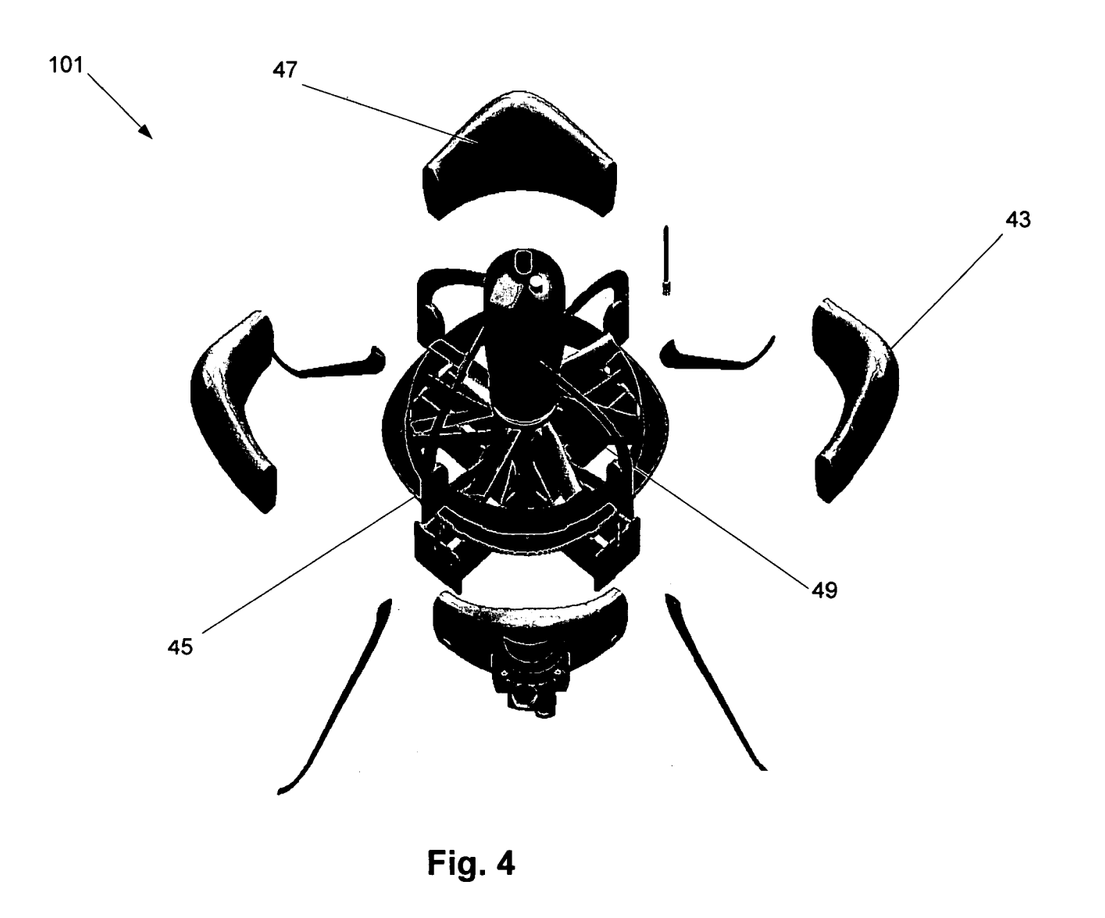
FIG. 4 is an expanded view of a ducted fan air vehicle having configurable equipment enclosures.

In another embodiment, as shown in FIG. 4, a UAV 101 may have configurable equipment enclosures 43 that may be configurable on a duct frame 45, and may be located in a plurality of locations on the duct frame 45. The configurable equipment enclosures 43 may comprise the duct for the fan 49. The configurable equipment enclosures 43 may be detachable or may be permanently attached, and may be attached to the duct in several locations. The configurable equipment enclosures 43 may be attached to the duct frame 45 in a variety of ways, such as by clips, adhesives, locks, snaplocks, rivets, screws, or other ways of fastening components known in the art. Having configurable equipment enclosures 43 that may be configurable provides flexibility in the weight and balance of the UAV 1, and may enable an operator to choose how much cargo and the appropriate equipment enclosure to place on the UAV 101.

Outside airflow 11, as described with respect to FIGS. 3a-3h, flows over at least part of the inside wall 47 of the equipment enclosure 43. Heat transfer may occur from the equipment to the inside wall 47, and from the inside wall 47 to the outside airflow 11. Thus, the UAV 101 having configurable equipment enclosures 43 containing equipment that requires cooling may be cooled by the methods described with respect to FIGS. 3a-3h.

It should be understood that the illustrated embodiments are examples only and should not be taken as limiting the scope of the present invention. The claims should not be read as limited to the described order or elements unless states to that effect. Therefore, all embodiments that come within the scope and spirit of the following claims and equivalents are claimed as the invention.

I claim:

1. An unmanned aerial vehicle (UAV) comprising:
   at least one duct, comprising:
      an inside duct wall,
      an outside duct wall,
         wherein the outside duct wall has a curved profile,
         wherein the outside duct wall contacts the inside duct wall to form an area between the inside duct wall and the outside duct wall, and
         wherein the area is at least partially enclosed and houses heat-generating equipment,
   at least one fan shaft;
   a plurality of fan blades, wherein the plurality of fan blades cause an airflow to flow in a direction substantially parallel to the inside duct wall;
   a plurality of stators, wherein the plurality of stators hold the at least one duct fixed in relation to the at least one fan shaft;
   a fan motor, wherein the fan motor rotates the plurality of fan blades around the at least one fan shaft; and
   a cooling mechanism at the inside duct wall for utilizing the airflow from the plurality of fan blades to cool the heat-generating equipment.

2. The UAV of claim 1, further comprising a vented opening in the inside duct wall, wherein the airflow enters the at least partially enclosed area through the vented opening.

3. The UAV of claim 2, further comprising an exhaust fan in the inside duct wall, wherein the exhaust fan exhausts air from the at least partially enclosed area.

4. The UAV of claim 1, wherein the inside duct wall is composed of a material having a thermal conductivity greater than 200 W/m*K.

5. The UAV of claim 1, further comprising at least one fan that circulates air inside the at least partially enclosed area, wherein heat is transferred to the inside duct wall when the air inside the at least partially enclosed area passes over the inside duct wall.

6. The UAV of claim 5, wherein the at least one fan circulates the air inside the at least partially enclosed area in an upward direction along the inside duct wall.

7. The UAV of claim 1, further comprising at least one heat pipe that transfers heat between the at least partially enclosed area and the inside duct wall.

8. The UAV of claim 1, further comprising:
   a pipe containing a coolant; and
   a pump for circulating the coolant through the pipe, wherein the coolant transfers heat from the at least partially enclosed area to the airflow.

9. The UAV of claim 1, further comprising at least one fin located on the inside duct wall and extending generally toward the at least one fan shaft, wherein the airflow passes over the at least one fin, and wherein the airflow carries away heat from the at least one fin.

10. The UAV of claim 1, further comprising at least one fin located on the inside duct wall in the at least partially enclosed area, wherein the at least one fin transmits heat from the at least partially enclosed area to the inside duct wall.

11. A configurable equipment enclosure comprising:
an inner wall, wherein the inner wall forms at least a portion of a duct of a ducted fan unmanned aerial vehicle (UAV),
an outer wall, and
a cooling mechanism at the inner wall for utilizing airflow through the duct to cool equipment within the configurable equipment enclosure.

12. The configurable equipment enclosure of claim 11, wherein the airflow enters the configurable equipment enclosure through a vented opening in the inner wall.

13. The configurable equipment enclosure of claim 11, wherein the airflow enters the equipment enclosure through the inner wall, and
wherein a fan exhausts the airflow from the configurable equipment enclosure.

14. The configurable equipment enclosure of claim 11, wherein the inner wall is composed of a material having a thermal conductivity greater than 200 W/m*K.

15. The configurable equipment enclosure of claim 11, further comprising at least one fan that circulates air inside the configurable equipment enclosure, wherein heat is transferred to the inner wall when the air inside the equipment enclosure passes over the inner wall.

16. The configurable equipment enclosure of claim 11, further comprising at least one heat pipe that transfers heat between the configurable equipment enclosure and the airflow.

17. The configurable equipment enclosure of claim 11, further comprising:
a pipe, wherein the pipe contains a coolant,
a pump for circulating the coolant through the pipe, wherein the coolant transfers heat from the configurable equipment enclosure to the airflow.

18. The configurable equipment enclosure of claim 11, further comprising a fan configured to generate the airflow, the configurable equipment enclosure further comprising at least one fin located on the inner wall and extending generally toward a center of the fan, wherein the airflow passes over the at least one fin, and wherein the airflow carries away heat from the at least one fin.

19. The configurable equipment enclosure of claim 11, further comprising at least one fin located in the configurable equipment enclosure, wherein the at least one fin transmits heat from the configurable equipment enclosure to the airflow.

20. A removable equipment enclosure comprising:
an inner wall, wherein the inner wall forms at least a portion of a duct of a ducted fan unmanned aerial vehicle (UAV),
an outer wall,
a cooling mechanism at the inner wall for utilizing airflow through the duct to cool equipment within the removable equipment enclosure,
at least one fan located in the removable equipment enclosure configured to circulate air inside the equipment enclosure, wherein heat is transferred to the inner wall as the air inside the removable equipment enclosure passes over the inner wall, and wherein heat is transferred to the airflow when the airflow passes over the inner wall.

* * * * *